United States Patent Office 2,817,637
Patented Dec. 24, 1957

2,817,637
PRODUCTION OF MOLYBDENUM-COBALT CATALYSTS

Frederick William Bertram Porter and Leslie Benjamin Witten, Sunbury-on-Thames, England, assignors to The British Petroleum Company Limited No Drawing. Application August 17, 1954, Serial No. 450,538

Claims priority, application Great Britain August 19, 1953

3 Claims. (Cl. 252—442)

This invention relates to the production of catalysts containing cobalt, molybdenum and fluorine incorporated with an alumina support. Such catalysts are particularly useful in the catalytic desulphurisation of petroleum hydrocarbons and methods for their production are disclosed in the specifications of the copending British applications Nos. 22,844/51 and 30,049/52, now accepted under the numbers 719,627 and 747,663, respectively. As set forth in British Patent No. 719,627, the fluorine content of the catalyst is in the range of 0.1% to 6% by weight.

Various methods have been proposed for the preparation of catalysts comprising the oxides of cobalt and molybdenum incorporated with a support, and the introduction of fluorine during the preparation of such catalysts may be effected in various ways. The known methods of preparing the cobalt and molybdenum oxide catalyst, however, suffer from certain disadvantages. Thus, a cobalt/molybdenum complex may be precipitated from solution and incorporated with a support, or the complex may be precipitated in the presence of a support, such as a metal oxide hydrogel for example alumina hydrogel. For example, a catalyst may be prepared by the addition of an alkaline solution of ammonium molybdate to a suspension of alumina hydrogel in cobalt nitrate solution. In any event, the precipitate must be washed to remove ammonium nitrate, resulting in the loss of costly materials. Again, a catalyst may be prepared by impregnating a support, such as granular or pelleted alumina, with separate solutions of cobalt and molybdenum salts or with a single alkaline solution of cobalt and molybdenum salts, and heating. This method involves either a two-stage impregnation or careful control of the alkalinity of the single solution to avoid precipitation of a cobalt/molybdenum complex.

The principal object of the present invention is to provide a method of catalyst production which avoids or reduces the above disadvantages and in particular avoids the production of a cobalt and molybdenum complex as a separate step in the production of the catalyst.

According to the invention, cobalt, molybdenum and fluorine compounds are added to wet alumina gel which is then dried and roasted to decompose said compounds and produce the finished catalyst.

The compounds of cobalt and molybdenum used are preferably those which have anions which decompose during the roasting of the catalyst. The preferred compound of molybdenum is molybdic acid and the preferred compound of cobalt is cobalt formate although the chloride and nitrate may also be used.

The fluorine is preferably introduced in the form of hydrofluoric acid or aluminum fluoride.

It is advisable to keep the roasting temperature at all times as low as possible, consistent with securing reaction between the various constituents, in order to limit the conversion of $\gamma$ to $\alpha$ alumina which tends to occur at higher temperatures and for the same reason to limit the temperature similarly when the catalyst is regenerated. We have found 550° C. to be a suitable temperature for these roasting operations.

A catalyst prepared in the manner described will contain its cobalt and molybdenum in a fully oxidised form, but it is often advisable, in order to obtain the best activity from the catalyst, partially to reduce the catalyst (and in particular to reduce $MoO_3$ to $MoO_2$) and this can conveniently be done by heating in presence of hydrogen (e. g. at 780° F. and 100 p. s. i. hydrogen pressure) until hydrogen ceases to be absorbed where the catalyst will not receive an equivalent treatment in its use for desulphurising. Moreover, the hydrogen sulphide produced in the desulphurisation reaction tends to convert a part of the oxides present in the catalyst into sulphides with elimination of water, but such conversion has little effect on the activity of the catalyst and our invention applies to such partially sulphided catalysts as well as to those which are unsulphided at the commencement of their use for desulphurisation. Indeed, we have found pretreatment with hydrogen sulphide gas at 100 p. s. i. ga. and 780° F. to be an effective alternative to pretreatment with hydrogen. These conversions and pretreatments have as far as can be determined no effect upon the fluorine which increases the activity of the catalyst as a whole.

The following are examples of the method of production according to the invention.

EXAMPLE I

A catalyst was prepared by addition of 114 g. of cobalt formate ($Co(CHO_2)_2 \cdot 2H_2O$) and 58 g. of molybdic acid ($H_2MoO_4$) together with 86 g. of aluminum fluoride ($AlF_3 \cdot 3H_2O$) to 6000 g. of wet alumina gel (10% wt. $Al_2O_3$). The mixture was diluted with 3 litres of distilled water. The slurry was filtered to reduce the water content of the mixture, and the resulting cake was dried, and then roasted for 2 hours at 550° C.

This catalyst, which contained 2.8 percent weight fluorine, was then used for autofining a Kuwait gas oil of 1.21 percent weight sulphur content under the following conditions:

Reactor temperature_____ 780° F.
Reactor pressure_____ Equilibrium, starting at 100 p. s. i. ga.
Recycle rate_____ 2000 C. F. B. set at 100 p. s. i. ga.
Feedstock_____ Kuwait gas oil.
Space velocity_____ 2.0 v./v./hr.

The sulphur contents of the products are given in Table 1. This catalyst was then regenerated using a mixture of nitrogen and air controlled such that the heat of combustion of the carbon did not cause the catalyst temperature to exceed 1050° F. Further runs, with regenerations between each run, were then performed under the conditions detailed previously with the exception that 0.012 percent weight of dichlorodifluoromethane was added to the feedstock. The results obtained were as follows:

Table 1

| No. of Regenerations | Organic Sulphur Content Percent wt. of Liquid Product at— | | | | | | | | |
|---|---|---|---|---|---|---|---|---|---|
| | 10 hr. | 25 hr. | 50 hr. | 75 hr. | 100 hr. | 125 hr. | 150 hr. | 175 hr. | 200 hr. |
| Nil | .08 | .01 | .03 | .04 | .07 | .13 | .17 | .22 | .32 |
| 1 | .05 | .01 | .02 | | | | | | |
| 2 | .07 | .02 | .02 | | | | | | |
| 3 | .06 | .02 | .01 | .02 | .08 | .08 | .11 | .19 | |
| 4 | .05 | .01 | .02 | .02 | .04 | .08 | .12 | .21 | .25 |
| 5 | .06 | .01 | .04 | .05 | .08 | | | | |
| 6 | .04 | .02 | .03 | .06 | .09 | | | | |
| 7 | .06 | .02 | .07 | | | | | | |
| 8 | .04 | .04 | .02 | | | | | | |
| 9 | .06 | .03 | .03 | | | | | | |

EXAMPLE II

A catalyst was prepared by the addition of 75 g. of 40% weight hydrofluoric acid solution, together with 130 g. of cobalt formate ($Co(HCO_2)_2 \cdot 2H_2O$) and 65 g. of molybdic acid ($H_2MoO_4$) to 6000 g. of wet alumina gel containing 10% weight $Al_2O_3$. The intimate mix was then dried and roasted for two hours at 550° C.

The finished catalyst was found to contain 2.8 percent weight fluorine and was used for autofining a Kuwait gas oil containing 1.21 percent weight sulphur under the conditions described in the previous example. No fluorine compounds were added to the feedstock during the first run but for the remainder 0.01 percent weight of tertiary butyl fluoride was added. The results are given in Table 2.

Table 2

| No. of Regenerations | Sulphur Contents of Products | | | | |
|---|---|---|---|---|---|
| | 10 Hours | 25 Hours | 50 Hours | 75 Hours | 100 Hours |
| Nil | 0.10 | 0.10 | 0.15 | 0.20 | 0.28 |
| 1 | 0.04 | 0.03 | 0.04 | 0.06 | 0.09 |
| 2 | 0.03 | 0.03 | 0.11 | 0.11 | 0.14 |
| 3 | 0.04 | 0.03 | 0.06 | 0.08 | 0.12 |
| 4 | 0.05 | 0.03 | 0.05 | 0.14 | 0.11 |

The method of preparing a catalyst comprising the oxides of cobalt and molybdenum, which comprises mixing molybdenum oxide or hydrated oxide and an organic salt of cobalt with a support, and heating to decompose the organic salt, forms the subject of the copending application No. 22,826/53.

We claim:

1. A method of preparing a catalyst containing cobalt, molybdenum and fluorine incorporated with an alumina support, which comprises forming a mixture of wet alumina gel, molybdic acid, cobalt formate and a fluorine compound selected from the group consisting of hydrofluoric acid and aluminium fluoride; drying said mixture; and, roasting same to decompose the cobalt, molybdenum and fluorine compounds incorporated with the gel, the fluorine content of the formed catalyst being in the range of 0.1% to 6% by weight.

2. The method of claim 1 in which the fluorine compound is hydrofluoric acid.

3. The method of claim 1 in which the fluorine compound is aluminum fluoride.

References Cited in the file of this patent

UNITED STATES PATENTS

| | | |
|---|---|---|
| 1,932,174 | Gaus et al. | Oct. 24, 1933 |
| 2,322,622 | Fischer et al. | June 22, 1943 |
| 2,486,361 | Nahin et al. | Oct. 25, 1949 |
| 2,499,255 | Parker | Feb. 28, 1950 |
| 2,510,189 | Nahin et al. | June 6, 1950 |
| 2,574,448 | Docksey | Nov. 6, 1951 |
| 2,638,454 | Rowan | May 12, 1953 |
| 2,687,381 | Hendricks | Aug. 24, 1954 |
| 2,690,433 | Engel et al. | Sept. 28, 1954 |
| 2,739,132 | Riedl | Mar. 20, 1956 |